United States Patent
Polly et al.

(10) Patent No.: US 10,890,115 B2
(45) Date of Patent: Jan. 12, 2021

(54) LOW TORQUE ENGINE STARTING WITH DUAL SPOOL POWER EXTRACTION WITH SUPERPOSITION GEARBOX

(71) Applicant: United Technologies Corporation, Farmington, CT (US)

(72) Inventors: Joseph H. Polly, Tolland, CT (US); Nicholas D. Leque, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 194 days.

(21) Appl. No.: 16/145,518

(22) Filed: Sep. 28, 2018

(65) Prior Publication Data

US 2020/0102892 A1    Apr. 2, 2020

(51) Int. Cl.
  *F02C 7/36*   (2006.01)
  *F02C 7/275*  (2006.01)
  *F02C 7/32*   (2006.01)
  *F16H 37/06*  (2006.01)

(52) U.S. Cl.
  CPC .............. *F02C 7/275* (2013.01); *F02C 7/32* (2013.01); *F02C 7/36* (2013.01); *F16H 37/065* (2013.01); *F05D 2260/40311* (2013.01); *F05D 2260/85* (2013.01)

(58) Field of Classification Search
  CPC .... F02C 7/32; F02C 7/36; F02C 7/275; F05D 2260/40311
  See application file for complete search history.

(56) References Cited

U.S. PATENT DOCUMENTS

| | | | | |
|---|---|---|---|---|
| 3,626,692 A | * | 12/1971 | Kumm | F02C 7/36 60/39.163 |
| 4,776,163 A | * | 10/1988 | Brockmann | F02C 7/32 60/792 |
| 7,168,913 B2 | * | 1/2007 | Lardellier | F02C 7/32 415/122.1 |
| 7,351,174 B2 | * | 4/2008 | Beutin | F02C 7/36 244/60 |

(Continued)

FOREIGN PATENT DOCUMENTS

WO    2008082335 A1    7/2008

OTHER PUBLICATIONS

European Search Report for European Application No. 19200595.7 dated Feb. 25, 2020.

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A disclosed turbofan engine includes a first spool including a first turbine; a second spool including a second turbine disposed axially forward of the first turbine, a first tower shaft engaged to the first spool, a second tower shaft engaged to the second spool, and a superposition gearbox including a sun gear, a plurality of intermediate gears engaged to the sun gear and supported in a carrier and a ring gear circumscribing the intermediate gears. The second tower shaft is engaged to drive the sun gear. A starter is selectively coupled to the sun gear through a starter clutch. A first clutch selectively couples the first tower shaft to the ring gear and a second clutch selectively couples the ring gear to a static structure of the engine. An accessory gearbox is driven by an output of the superposition gearbox.

17 Claims, 3 Drawing Sheets

(56) References Cited

U.S. PATENT DOCUMENTS

| | | | |
|---|---|---|---|
| 7,481,062 B2* | 1/2009 | Gaines | F02C 7/36 |
| | | | 60/792 |
| 7,552,582 B2* | 6/2009 | Eick | F02C 3/107 |
| | | | 60/39.163 |
| 7,758,302 B2* | 7/2010 | Linet | F02C 3/107 |
| | | | 415/68 |
| 7,882,691 B2* | 2/2011 | Lemmers, Jr. | F02C 7/275 |
| | | | 475/6 |
| 2007/0130959 A1 | 6/2007 | Linet et al. | |
| 2007/0151258 A1 | 7/2007 | Gaines et al. | |
| 2013/0247539 A1* | 9/2013 | Hoppe | F02C 7/32 |
| | | | 60/39.15 |
| 2018/0010522 A1 | 1/2018 | Harder et al. | |
| 2018/0010523 A1 | 1/2018 | Harder et al. | |
| 2018/0135512 A1* | 5/2018 | Poulin | F02C 3/113 |
| 2018/0149091 A1* | 5/2018 | Howell | F02C 7/36 |

\* cited by examiner

LOW TORQUE ENGINE STARTING WITH DUAL SPOOL POWER EXTRACTION WITH SUPERPOSITION GEARBOX

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

A high pressure turbine drives the high pressure compressor through an outer shaft to form a high spool, and the low pressure turbine drives the low pressure compressor through an inner shaft to form a low spool. The fan section may also be driven by the low pressure turbine through the inner shaft.

The engine is typically started by driving the high spool through a tower shaft with a starter through an accessory gearbox. Once the high spool is up to speed, the low spool follows and the engine is brought to an idle condition. When the engine is operating, the accessory gearbox is driven through the same tower shaft to drive accessory components such as hydraulic pumps and electric generators.

Turbine engine manufacturers continue to seek further improvements to engine performance including improvements to thermal, transfer and propulsive efficiencies.

SUMMARY

A turbofan engine according to an exemplary embodiment of this disclosure includes, among other possible things, a first spool including a first turbine; a second spool including a second turbine disposed axially forward of the first turbine; a first tower shaft engaged to the first spool; a second tower shaft engaged to the second spool; a superposition gearbox including a sun gear, a plurality of intermediate gears engaged to the sun gear and supported in a carrier and a ring gear circumscribing the intermediate gears, wherein the second tower shaft is engaged to drive the sun gear; a starter selectively coupled to the sun gear through a starter clutch; a first clutch for selectively coupling the first tower shaft to the ring gear; a second clutch for selectively coupling the ring gear to a static structure of the engine; and an accessory gearbox driven by an output of the superposition gearbox.

In a further embodiment of the foregoing turbofan engine, the output of the superposition gearbox comprises a carrier shaft attached to the carrier.

In another embodiment of any of the foregoing turbofan engines, the superposition gearbox includes the carrier shaft attached to the carrier to drive gear systems within the accessory gearbox, and a sun gear shaft that is coupled to the sun gear, the second tower shaft, and the starter through the starter clutch.

In another embodiment of any of the foregoing turbofan engines, the first turbine comprises a low pressure turbine and the second turbine comprises a high pressure turbine.

In another embodiment of any of the foregoing turbofan engines, the first tower shaft and the second tower shaft are concentric about a common axis.

In another embodiment of any of the foregoing turbofan engines, the first tower shaft and the second tower shaft are disposed about different axes.

In another embodiment of any of the foregoing turbofan engines, the starter clutch, first clutch and the second clutch comprise one-way mechanical clutches.

In another embodiment of any of the foregoing turbofan engines, the first clutch couples the first tower shaft to the ring gear and the second tower shaft drives the sun gear in a first operating condition such that both the first tower shaft and the second tower shaft combine to drive the output.

In another embodiment of any of the foregoing turbofan engines, the second clutch couples the ring gear to the static engine structure. The starter clutch couples the starter to the sun gear and the first clutch couples the first tower shaft to the ring gear such that the starter drives the sun gear and thereby the second tower shaft and the second spool in a starting operating condition.

In another embodiment of any of the foregoing turbofan engines, the second clutch decouples the ring gear from the static structure and couples the first clutch in response to rotation of the first tower shaft driven by the first spool.

An auxiliary gearbox drive system for a turbofan engine according to an exemplary embodiment of this disclosure includes, among other possible things, a sun gear, wherein the sun gear is coupled to a second tower shaft of the turbofan engine; a plurality of intermediate gears engaged to the sun gear and supported in a carrier; a ring gear circumscribing the intermediate gears; a starter selectively coupled to the sun gear through a starter clutch; a first means for selectively coupling the ring gear to a first tower shaft of the turbofan engine; a second means for selectively coupling the sun gear to a fixed structure; and an output to an auxiliary gearbox.

In a further embodiment of the foregoing auxiliary gearbox drive system for a turbofan engine, the output to the auxiliary gearbox comprises a carrier shaft attached to the carrier.

In another embodiment of any of the foregoing auxiliary gearbox drive systems for a turbofan engine, each of the first means for selectively coupling the ring gear to the first tower shaft and the second means for selectively coupling the ring gear to the fixed engine structure are one-way mechanical clutches.

In another embodiment of any of the foregoing auxiliary gearbox drive systems for a turbofan engine, the first means couples the first tower shaft to the ring gear and the second tower shaft drives the sun gear in a first operating condition such that both the first tower shaft and the second tower shaft combine to drive the carrier shaft.

In another embodiment of any of the foregoing auxiliary gearbox drive systems for a turbofan engine, the second means couples the ring gear to the fixed structure when the starter is driving the sun gear to rotate an engine spool through the second tower shaft in a starting operating condition.

A method of operating an auxiliary gearbox for a turbofan engine according to an exemplary embodiment of this disclosure includes, among other possible things, coupling a first tower shaft to engage a first spool; coupling a second tower shaft to engage a second spool; coupling a sun gear of a superposition gearbox to the second tower shaft, wherein the superposition gearbox includes the sun gear, a plurality of intermediate gears engaged to the sun gear and supported in a carrier and a ring gear circumscribing the intermediate gears; selectively coupling a starter to the sun gear; and selectively coupling the ring gear to an engine static structure; and driving the second spool with the starter through the sun gear to rotate the second spool and start the turbofan engine.

In a further embodiment of the foregoing method of operating an auxiliary gearbox for a turbofan engine, coupling the first tower shaft is coupled to the ring gear such that the first tower shaft drives the ring gear and the second tower shaft drives the sun gear once both the first spool and the second spool are rotating independent of rotation of the starter. Both the first tower shaft and the second tower shaft combine to drive an output shaft from the superposition gearbox.

In a further embodiment of any of the foregoing methods of operating an auxiliary gearbox for a turbofan engine, the output shaft is attached to the carrier and drives gear systems disposed within an accessory gearbox.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
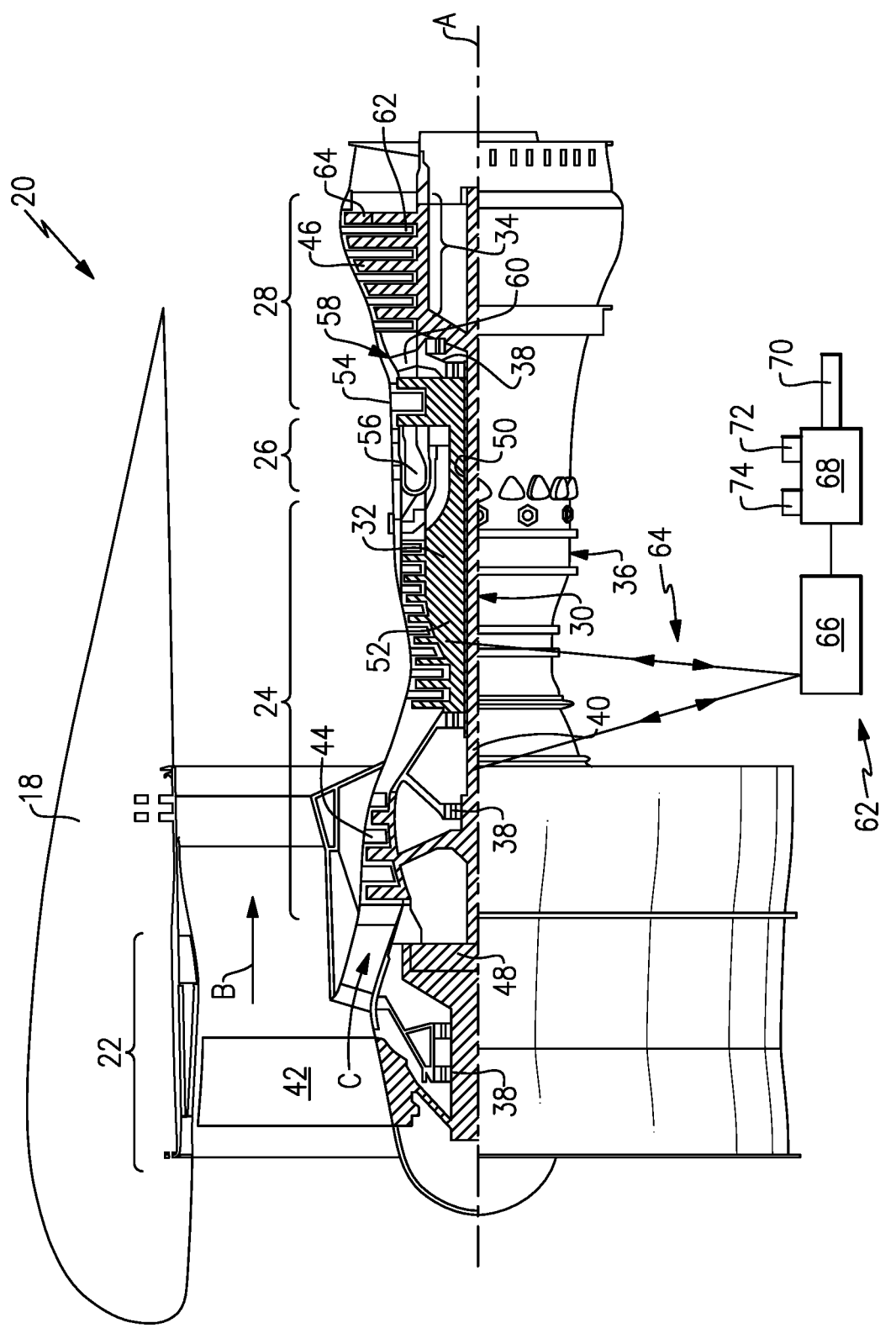
FIG. 1 is a schematic view of an example gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption —also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and, therefore, the relationship between the number of turbine rotors 34 in the low pressure turbine 46 and the number of blades 42 in the fan section 22 disclose an example gas turbine engine 20 with increased power transfer efficiency.

The example engine 20 includes an accessory drive system 62 that receives power from both the high speed spool 32 and the low speed spool 30. The accessory drive system 62 drives an accessory gearbox 68 that includes accessory component 72 and lubricant pump 74. The accessory component 72 may include pumps, generators and other devices driven to enable operation of different engine and aircraft systems. The accessory gearbox 68 is also coupled to a starter 70. The starter 70 is capable of driving the accessory drive system 62 to start the engine 20. In this example, a tower shaft assembly 64 is coupled to both the low speed spool 30 and the high speed spool 32 to distribute power extraction between the two spools 30, 32.

Excessive power extraction from a single spool, such as the high speed spool 32, can limit operation and degrade overall performance and engine efficiency. Accordingly, the example accessory drive system 62 extracts power from both the low speed spool 30 and the high speed spool 32 to meet the overall power demands of the engine 20 and the aircraft associated with the engine.

Figure 2:
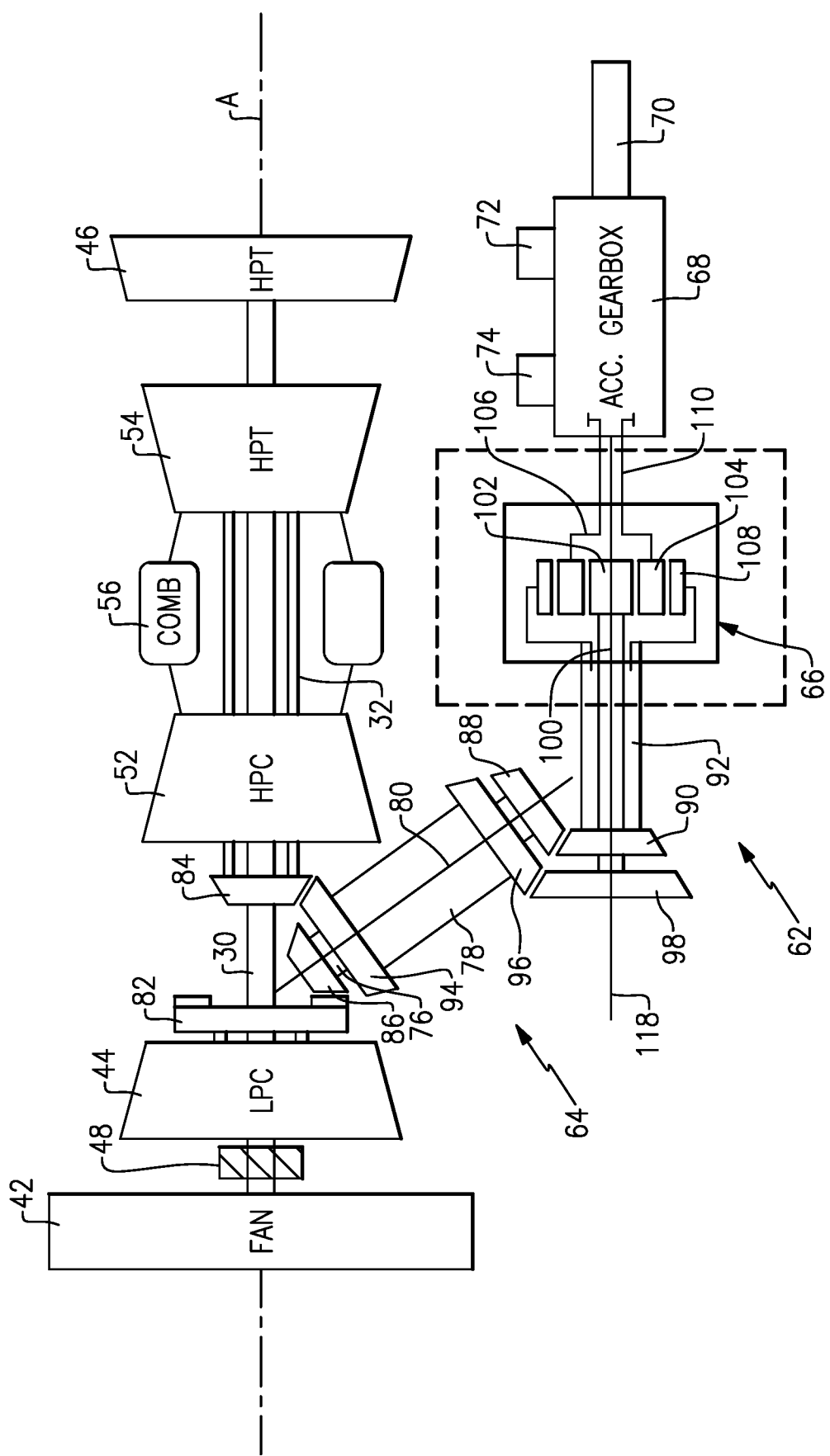
FIG. 2 is a schematic representation of the example accessory drive system.

Referring to FIG. 2, with continued reference to FIG. 1, the example accessory drive system 62 includes a superposition gearbox 66 that is coupled between accessory gearbox 68 and the tower shaft assembly 64. The superposition gearbox 66 is an epicyclic gearbox that includes a sun gear 102 that rotates about an axis 118. A plurality of intermediate gears 104 are engaged with the sun gear 102 and supported by a carrier 106. A ring gear 108 circumscribes and is engaged with the plurality of intermediate gears 104.

In the disclosed example, the tower shaft assembly 64 includes a first tower shaft 76 that is driven by a gear 82 disposed on the low speed spool 30. A first gear 86 on the tower shaft 76 is coupled to the gear 82. A second gear 88 is disposed on a second end of the tower shaft 76 and engages a drive gear 90 disposed on a ring gear shaft 92.

A second tower shaft 78 is coupled to a drive gear 84 that is driven by the high speed spool 32. The second tower shaft 78 includes a first gear 94 driven by the gear 84 on the high speed spool 32. A second gear 96 of the second tower shaft 78 is engaged to drive gear 98 disposed on a sun gear shaft 100. In this example, the first tower shaft 76 and the second tower shaft 78 are disposed concentrically about a common axis 80. Moreover, the axis 80 is disposed at an angle relative to the engine longitudinal axis A and an axis 112 of the superposition gearbox 66. It should be appreciated that although the specific disclosed embodiment includes concentric tower shafts 76, 78, other configurations and orientations of the tower shafts are within the contemplation and scope of this disclosure.

First tower shaft 76 is coupled to the ring gear shaft 92 that is selectively coupled to the ring gear 108. The second tower shaft 78 is coupled to the sun gear shaft 100 that is coupled to drive the sun gear 102. The sun gear shaft 100 is directly coupled to the sun gear 102 and extends past the sun gear 102 to the accessory gearbox 68.

The superposition gearbox 66, therefore, has a first input provided by the first tower shaft 76 through the ring gear shaft 92 to drive the ring gear 108 and a second input provided by the second tower shaft 78 to drive the sun gear shaft 100 and, thereby, the sun gear 102. A first output from the superposition gearbox 66 is provided by a carrier shaft 110 that is coupled to the carrier 106. The carrier shaft 110 drives portions of the accessory gearbox 68 in the disclosed example embodiment. The accessory gearbox 68 includes another gear system or plurality of gears as is required to the drive accessory components schematically illustrated at 72 and 74.

The sun gear shaft 100 provides a second output that extends through the accessory gearbox 68 and is coupled to the starter 70. The starter 70 provides a driving input to the sun gear 102 through the sun gear shaft 100.

Figure 3:
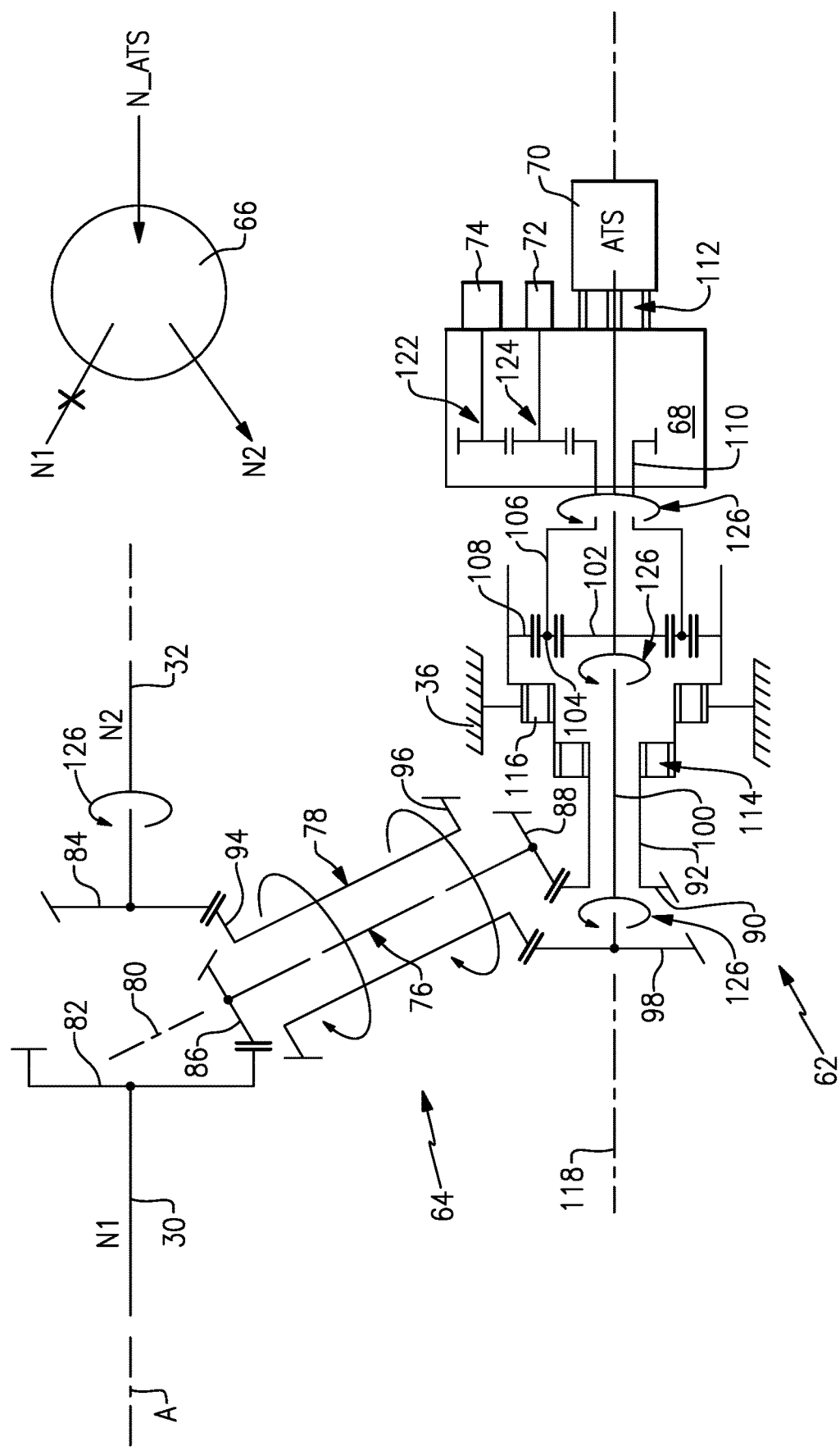
FIG. 3 is a schematic illustration of the accessory drive system in a starting operating condition.

Referring to FIG. 3, with continued reference to FIG. 2, the example superposition gearbox 66 includes a direct connection between the starter 70 and the sun gear shaft 100 to provide for direct driving of the high speed spool 32. The sun gear shaft 100 is coupled to the starter 70 through a starter clutch 112. The starter clutch 112 in this example is a mechanical one-way clutch that enables direct driving of the high speed spool 32 during starting operations. Once the high speed spool 32 is operating, the starter clutch 112 prevents back driving or over driving of the starter 70. The sun gear shaft 100 is directly connected to the starter rather than being driven through a gear system. The direct drive of the high speed spool 32 through the direct connection simplifies operation and the mechanical connections.

Moreover, the example superposition gearbox 66 provides the first output through the carrier shaft 110 that drives gear systems 122, 124 that in turn drive the accessory components 72, 74. Once the engine is started, the first output through the carrier shaft 110 provides the driving input required to power the accessory components 72, 74.

The superposition gearbox 66 includes a first clutch 114 that couples the ring gear shaft 92 to the ring gear 108. A second clutch 116 couples the ring gear 108 to a static engine structure 36. In this example, both the first clutch 114 and 116 are mechanical one-way clutches. Moreover, in this example, the first and second mechanical one-way clutches 114, 116 are sprag clutches. It should be appreciated that although sprag clutches are disclosed by way of example, other mechanical clutch systems could be utilized and are within the contemplation of this disclosure.

The second clutch 116 couples the ring gear 108 to the engine static structure 36 during a starting operation to prevent reverse rotation of the ring gear 108 and thereby the first tower shaft 76 and the low speed spool 30. When the ring gear 108 is fixed, the starter 70 will drive the sun gear shaft 100 such that it will be the only driving output back to the high speed spool 32.

During a starting operation, the starter 70 will drive the sun gear shaft in a first direction as is indicated by arrows 126. The starter clutch 112 will engage and enable driving of the sun gear shaft 100 by the starter 70. The same rotation provided by the starter 70 will engage the ring gear 108 such that the second clutch 116 will lock the ring gear 108 to the static structure to prevent rotation of the ring gear 108. The first clutch 114 is not locked in this direction, but does not receive a driving input and therefore does not rotate the corresponding first tower shaft 76. The starter 70 thereby directly drives the high speed spool 32 to start the engine.

Once the engine has started and the high speed spool 32 is rotating at speed, the starter 70 will be stopped. The high speed spool 32 will begin driving the second tower shaft 78 and thereby the sun gear shaft 100. The higher speed provided by the driving of the high speed spool 32 will disengage the starter 70. Additionally, once the low speed spool 30 begins operation, the first tower shaft 76 will being rotating. The first clutch 114 will then engage to couple the ring gear shaft 92 to the ring gear 108. In this operating condition, both the low speed spool 30 and the high speed spool 32 will drive portions of the superposition gearbox 66. The first clutch 114 will couple power from the first tower shaft 76 to the ring gear 108. The second clutch 116 will free wheel and allow rotation of the ring gear 108. The second tower shaft 78 will drive the sun gear 102 and thereby the intermediate gears 104 and the carrier 106. The carrier 106 will in turn drive carrier shaft 110 to drive the gear systems 122, 124 within the accessory gearbox 68. Power from each of the high spool 32 and the low spool 30 will be split to drive the carrier shat 110 and power the accessory components 72 74 throughout engine operation.

The example accessory drive system 62 includes a superposition gearbox 66 that automatically distributes input driving torque between the low speed spool 30, the high speed spool 32 and the accessory gearbox 68 as required during engine operation. The selective operation of the superposition gearbox 66 is enabled by first and second one-way clutches that provide different combinations of inputs and outputs that automatically couple based engine operating conditions. Moreover, the direct starting input from the starter is enabled by the coupling of the starter directly to the sun gear shaft along with fixing of the ring gear by a one-way mechanical clutch.

Although an example embodiment has been disclosed, a worker of ordinary skill in this art would recognize that this disclosure is not just a material specification and that certain modifications would come within the scope of this disclosure. For that reason, the following claims should be studied to determine the scope and content of this disclosure.

What is claimed is:

1. A turbofan engine comprising:
    a first spool including a first turbine;
    a second spool including a second turbine disposed axially forward of the first turbine;
    a first tower shaft engaged to the first spool;
    a second tower shaft engaged to the second spool;
    a superposition gearbox including a sun gear, a plurality of intermediate gears engaged to the sun gear and supported in a carrier and a ring gear circumscribing the intermediate gears, wherein the second tower shaft is engaged to drive the sun gear;
    a starter selectively coupled to the sun gear through a starter clutch;
    a first clutch for selectively coupling the first tower shaft to the ring gear;
    a second clutch for selectively coupling the ring gear to a static structure of the engine; and
    an accessory gearbox driven by an output of the superposition gearbox.

2. The turbofan engine as recited in claim 1, wherein the output of the superposition gearbox comprises a carrier shaft attached to the carrier.

3. The turbofan engine as recited in claim 2, wherein the superposition gearbox includes the carrier shaft attached to the carrier to drive gear systems within the accessory gearbox and a sun gear shaft that is coupled to the sun gear, the second tower shaft and the starter through the starter clutch.

4. The turbofan engine as recited in claim 1, wherein the first turbine comprises a low pressure turbine and the second turbine comprises a high pressure turbine.

5. The turbofan engine as recited in claim 1, wherein the first tower shaft and the second tower shaft are concentric about a common axis.

6. The turbofan engine as recited in claim 1, wherein the first tower shaft and the second tower shaft are disposed about different axes.

7. The turbofan engine as recited in claim 1, wherein the starter clutch, first clutch and the second clutch comprise one-way mechanical clutches.

8. The turbofan engine as recited in claim 1, wherein the first clutch couples the first tower shaft to the ring gear and the second tower shaft drives the sun gear in a first operating condition such that both the first tower shaft and the second tower shaft combine to drive the output.

9. The turbofan engine as recited in claim 8, wherein the second clutch couples the ring gear to the static engine structure and the starter clutch couples the starter to the sun gear and the first clutch couples the first tower shaft to the ring gear such that starter drives the sun gear and thereby the second tower shaft and the second spool in a starting operating condition.

10. The turbofan engine as recited in claim 9, wherein the second clutch decouples the ring gear from the static structure and couples the first clutch in response to rotation of the first tower shaft driven by the first spool.

11. An auxiliary gearbox drive system for a turbofan engine, the auxiliary gearbox drive system comprising:
    a sun gear, wherein the sun gear is coupled to a second tower shaft of the turbofan engine;
    a plurality of intermediate gears engaged to the sun gear and supported in a carrier;
    a ring gear circumscribing the intermediate gears;
    a starter selectively coupled to the sun gear through a starter clutch;
    a first means for selectively coupling the ring gear to a first tower shaft of the turbofan engine;
    a second means for selectively coupling the ring gear to a fixed structure; and
    an output to an auxiliary gearbox.

12. The auxiliary gearbox as recited in claim 11, wherein the output to the auxiliary gearbox comprises a carrier shaft attached to the carrier.

13. The auxiliary gearbox as recited in claim 12, wherein each of the first means for selectively coupling the ring gear to the first tower shaft and the second means for selectively coupling the ring gear to the fixed engine structure are one-way mechanical clutches.

14. The auxiliary gearbox as recited in claim 12, wherein the first means couples the first tower shaft to the ring gear and the second tower shaft drives the sun gear in a first operating condition such that both the first tower shaft and the second tower shaft combine to drive the carrier shaft.

15. The auxiliary gearbox as recited in claim 14, wherein the second means couples the ring gear to the fixed structure when the starter is driving the sun gear to rotate an engine spool through the second tower shaft in a starting operating condition.

16. A method of operating an auxiliary gearbox for a turbofan engine comprising:
    coupling a first tower shaft to engage a first spool;

coupling a second tower shaft to engage a second spool;
coupling a sun gear of a superposition gearbox to the second tower shaft, wherein the superposition gearbox includes the sun gear, a plurality of intermediate gears engaged to the sun gear and supported in a carrier and a ring gear circumscribing the intermediate gears;
selectively coupling a starter to the sun gear;
selectively coupling the ring gear to an engine static structure;
driving the second spool with the starter through the sun gear to rotate the second spool and start the turbofan engine; and
coupling the first tower shaft to the ring gear such that the first tower shaft drives the ring gear and the second tower shaft drives the sun gear once both the first spool and the second spool are rotating independent of rotation of the starter such that both the first tower shaft and the second tower shaft combine to drive an output shaft from the superposition gearbox.

17. The method as recited in claim 16, wherein the output shaft is attached to the carrier and drives gear systems disposed within an accessory gearbox.

\* \* \* \* \*